United States Patent
Bolln et al.

(10) Patent No.: US 8,390,140 B2
(45) Date of Patent: Mar. 5, 2013

(54) WIND ENERGY INSTALLATION WITH A HEATING DEVICE

(75) Inventors: Soenke Bolln, Heide/Holstein (DE); Oliver Sievers, Fockbek (DE); Michael Scheffner, Rickert (DE)

(73) Assignee: REpower Systems AG, Hamburg (DE)

( * ) Notice: Subject to any disclaimer, the term of this patent is extended or adjusted under 35 U.S.C. 154(b) by 282 days.

(21) Appl. No.: 12/742,566

(22) PCT Filed: Nov. 12, 2008

(86) PCT No.: PCT/EP2008/009515
§ 371 (c)(1),
(2), (4) Date: May 12, 2010

(87) PCT Pub. No.: WO2009/062668
PCT Pub. Date: May 22, 2009

(65) Prior Publication Data
US 2010/0253079 A1    Oct. 7, 2010

(30) Foreign Application Priority Data
Nov. 12, 2007    (DE) .................... 10 2007 054 215

(51) Int. Cl.
*F03D 9/00* (2006.01)
(52) U.S. Cl. ........................................................ 290/44
(58) Field of Classification Search .................. 290/44, 290/55; 415/1; 416/1; 700/286, 287
See application file for complete search history.

(56) References Cited

U.S. PATENT DOCUMENTS

| | | | | |
|---|---|---|---|---|
| 3,478,532 A | * | 11/1969 | Cootey et al. | 62/184 |
| 4,565,929 A | * | 1/1986 | Baskin et al. | 290/44 |
| 2004/0178638 A1 | * | 9/2004 | Wobben | 290/44 |
| 2009/0289461 A1 | * | 11/2009 | Larsen | 290/55 |
| 2011/0012362 A1 | * | 1/2011 | Kawai et al. | 290/55 |

FOREIGN PATENT DOCUMENTS

DE   10 2004 061 391   7/2006

OTHER PUBLICATIONS

Lacroix, A., et al. "Wind Energy: Cold Weather Issues," University of Massachusetts at Amherst, Renewable Research Laboratory. (Jun. 2000); 17 pages.

* cited by examiner

*Primary Examiner* — Tulsidas C Patel
*Assistant Examiner* — Viet Nguyen
(74) *Attorney, Agent, or Firm* — Morrison & Foerster LLP

(57) ABSTRACT

A wind energy installation connected to a network. The installation includes a tower and a pod having a wind rotor and a generator driven by the wind rotor. The installation further includes a converter configured to output electrical power, a control device provided with a temperature sensor and a heating device, and a preheating module. The preheating module includes a thermal switch configured to monitor a temperature of at least one component of the wind energy installation and a monitoring unit having an output device. The monitoring unit operates the heating device until the thermal switch reaches a threshold, whereupon the output device transmits an enable signal to start the wind energy installation. Operational reliability of the wind energy installation in low ambient temperatures can be thus improved.

14 Claims, 2 Drawing Sheets

WIND ENERGY INSTALLATION WITH A HEATING DEVICE

REFERENCE TO RELATED APPLICATIONS

This application is a national stage application under 35 USC 371 of International Application No. PCT/EP2008/009515, filed Nov. 12, 2008, which claims the priority of German Patent Application No. 10 2007 054 215.3, filed Nov. 12, 2007, the contents of which prior applications are incorporated herein by reference.

FIELD OF THE INVENTION

The invention relates to a wind energy installation having a tower, a pod which is arranged thereon and has a wind rotor and a generator driven by it, having a converter for outputting electrical power and having a control device, wherein the wind energy installation is connected to a network, and a temperature sensor and a heating device are provided for the control device.

BACKGROUND OF THE INVENTION

In order to ensure good operating conditions, wind energy installations are frequently installed in exposed positions, where the wind is stronger, but where the environmental conditions are also worse. This also includes coastal areas or mountainous or hilly areas beyond the temperate latitude zones, in particular in subarctic or arctic regions. Because of this choice of location and because of the fact that many components of the wind energy installation are arranged at high altitude, this therefore results in the problem of protection against low temperatures. This is particularly applicable to the sensitive electronics which are used in control devices.

It is generally known for wind energy installations for installation at extreme climatic locations to be provided with a climate-control device for the pod and for the components arranged therein. A climate-control device such as this, which may include both heating and cooling, uses an extremely large amount of energy, however, and therefore considerably reduces the efficiency of the wind energy installation. This is true even if the cooling is dispensed with, and only heating devices are provided instead. Although this is adequate for installation in relatively cool climatic environments, a considerable amount of energy is still required for heating, thus correspondingly reducing the efficiency.

In order to overcome this, it has therefore been proposed that a switchgear cabinet with a dehumidification installation be provided in order to accommodate the electronics of the control device. This is designed to reduce the humidity in the switchgear cabinet to such an extent that condensation cannot form, even in relatively cool temperatures. This protects the electronics against the negative consequences of moisture precipitation without having to heat the entire switchgear cabinet to relatively high temperature values to do so, as is traditionally necessary in the case of a pure heating device. This reduces the energy consumption.

One disadvantage of the known methods and apparatuses is their behavior when the network fails. Since the heating device and the dehumidifying device are fed with network power, they fail when the network fails; they are switched on again in a corresponding manner when the network returns. One problem in this case is that if the external temperatures during the network failure are relatively low, the wind energy installations and their components may have cooled down to such an extent that defects may occur if the wind energy installation and its heating devices are simply switched on again, to be precise defects in particular in the sensitive control electronics.

SUMMARY OF THE INVENTION

The invention is based on the object of improving a wind energy installation of the type mentioned initially to the extent that an improved response is achieved, in particular in the event of network failure at low temperatures.

The inventive solution lies in the features broadly disclosed herein. Advantageous developments are described in the disclosure below.

According to the invention, in the case of a wind energy installation having a tower, a pod which is arranged thereon and has a wind rotor and a generator driven by it, having a converter for outputting electrical power and having a control device, wherein a temperature sensor and a heating device are provided for the control device, the invention provides that an additional preheating module is provided, a thermal switch, which monitors the temperature of at least one component of the wind energy installation and is operated on reaching a threshold, a monitoring unit and an output device, and interacts with the heating device such that the monitoring unit operates the heating device until the thermal switch responds, and the output device then transmits an enable signal.

The essence of the invention is the idea of starting up the wind energy installation in a specific predefined manner at the start of operation. Account is taken of the temperature in the wind energy installation for the starting up process, in this case. This is based on the idea that, by its nature, an operating failure, such as a network failure, lasts for an intrinsically undefined time. It can last for a sufficiently long time for a wind energy installation which was previously at the operating temperature to cool down completely. The state of the network can be monitored by a network failure detector. When the network returns, a heating device which may be provided would conventionally be operated, although the wind energy installation would otherwise be started up immediately. This means that the full operating voltage and current are applied to the sensitive electronics in the control device. This can result in damage. This also applies in particular to the power semiconductors (IGBTs) in the converters. The purpose of the invention now relates to the situation when the network voltage returns at the end of a network failure, when the starting up of the wind energy installation is controlled by the monitoring unit in such a way that the heating devices are operated first of all and an enable signal is not output until the corresponding sensitive components of the wind energy installation have been sufficiently heated in order to start the normal starting-up process. The preheating module according to the invention is therefore designed for specific heating devices to be operated first of all, in a specific sequence, until a specified temperature is reached, with the starting-up process not being enabled per se until then. This results in the wind energy installation being heated up in a controlled manner. This represents a considerable advantage, particularly for operation in relatively cool and cold climatic zones. The risk of failures resulting from cold components being switched on prematurely, as is possible to occur traditionally in the prior art after network failures, even when heating devices were provided, therefore no longer exists thanks to the invention.

The enable signal from the monitoring unit preferably acts directly or indirectly on a switching unit, which produces the electrical power supply for at least one component of the wind energy installation. In the simplest case, the enable signal acts directly on a switching relay. However, it may also be provided in an indirect manner for example by the enable signal activating an uninterruptible power supply unit (UPS unit), which then supplies electrical power to the corresponding components of the wind energy installation. The UPS unit is in this case preferably designed such that it has the switching unit, and the monitoring unit is designed to switch on the UPS unit only when the other components have been heated to a specific temperature. In this case, the UPS unit means a unit which makes use of any given electrical energy source for supplying the components, that is to say for example a battery, a capacitor, a diesel generator, a fuel cell or the electrical network.

The preheating module uses the value measured by a temperature sensor as input signals. However, a timer is preferably additionally provided, which presets a minimum switched-on duration for the heating device. In this case, the timer can be set such that either a minimum time after the network return is defined and/or a minimum time after the reaching of the temperature threshold defined by the temperature measurement sensor. In both situations, the provision of the minimum time makes it possible to ensure that any precipitation which may be present or residual moisture on contacts and electrical components is vaporized independently of the respectively prevailing temperature and other environmental conditions, such as air humidity. This results in a considerable gain in operational reliability, in particular for operation in very humid climatic conditions, for example on the coast or offshore. In particular, the preheating module can also evaluate the humidity measured by a humidity sensor, and can switch on the heating device until a temperature threshold is overshot and/or a relative humidity is undershot.

It may be sufficient to provide a heating device for the sensitive components of the wind energy installation (generally this will be a switchgear cabinet with the power semiconductors and the control device). However, in general, a plurality of heating devices are preferably provided. This makes it possible to preheat different components in the wind energy installations, in particular those electronic components or switchgear cabinets with built-in electronic components. These are preferably in the form of a unit for an uninterruptible power supply, a top box which is arranged in the pod and the components of the control device arranged in the pod, and/or a bottom box, which is generally arranged at the foot of the tower or on an intermediate platform at low level, in order to preheat the components of the control device located at the bottom, as well as the connections from and to the transformer, which connects the wind energy installation to the network. Furthermore, other components are also feasible, such as transmissions, oil sump heating, oil control, lubrication devices, rotor blade heating, roller bearings, converter control, aviation warning lighting devices, communication electronics, vibration dampers or cap-changing transformer controls.

It is particularly preferable to provide a temperature sensor and a heating device on the pitch control unit for wind energy installations having a wind rotor whose blade pitch angle is adjusted by means of a pitch control unit. This is a particularly critical element for reliable operation of the wind energy installations and which must be operated to a considerable extent even when the wind energy installation is being started up (for example in order to move the rotor blades from their rest position acting as a windmill). The preheating of the pitch system can therefore be controlled more accurately. A timing relay is preferably additionally provided, is connected in parallel with the temperature sensor, and switches after an adjustable time. The starting-up process can therefore be continued even if the temperature sensor is defective, or in the event of a defect in the heating device for this unit, on reaching a specific time, which is regarded as safe. Overall, the separate monitoring of individual components, such as the pitch control unit, offers the advantage that, when its operating temperature is reached, the other components, such as the top box, bottom box or the UPS unit, can be connected automatically in order then to carry out the start-up process in the conventional manner.

In particular, it is expedient for the monitoring unit to be designed to connect the UPS unit only when the other components have been heated to a specific temperature.

In one preferred embodiment, an ambient temperature sensor is provided, which interacts with a bypass module and switches on the enable signal on the output device directly when a specific external temperature is exceeded. The ambient temperature sensor is preferably arranged such that a representative temperature is measured and evaluated. The bypass module is designed such that the enable signal is output directly when this temperature value is higher than the selected parameter (for example 5° C.). The components of the wind energy installations are then warm enough to commence the starting-up process for the wind energy installation immediately without preheating. For this purpose, voltage is applied to the control device for the wind energy installation immediately after the network returns. This therefore avoids unnecessary shut-down times of the wind energy installation when the network returns and the weather is warm.

The monitoring unit preferably operates the heating device only when at least one temperature limit value of at least one of the components has been undershot. For this purpose, the monitoring unit may have a logic element which operates in the sense of an OR logic operation. If the temperature at any of the components is now below a threshold defined by the operator, then the heating device is operated. If they are all above the threshold, then the components of the wind energy installation are all warm enough, and the start-up process can be carried out without preheating.

A reheating module is furthermore expediently provided which preferably operates the heating devices as a function of the external temperature, even after the enable signal has been output. The wind energy installation can therefore be started even earlier when the external temperatures are particularly low, with the reheating ensuring that the critical components are still heated even during the starting-up process of the wind energy installation. In consequence, it is even possible to counteract an undesirable drop in the temperature at the start of operation of the wind energy installation, for example when the pod is turned into the wind direction, thus resulting in the additional risk of the components being cooled down. The reliability of the heating-up process can thus be increased; furthermore, the preheating time can thus be shortened, thus allowing the wind energy installation to be started up more quickly overall.

In a further embodiment of the invention, the reheating module can activate the heating devices as a function of the ambient temperature independently of the starting of the wind energy installation, in order to prevent the wind energy installation from cooling down to a damaging extent during operation when, for example, the wind speed is so low that the wind energy installation is producing little energy and therefore little waste heat. For this purpose, the reheating module preferably has a temperature monitor which interacts with the monitoring unit such that the heating device is operated when a limit temperature is undershot during operation. In addition, an internal temperature sensor can be provided, which is applied as an input signal to the temperature monitor. When the internal temperature sensor finds that the temperature in the pod of the wind energy installation is also below a specific temperature, then the temperature monitor is triggered, and reheating is carried out. When the wind energy installation then reaches the desired temperature during operation as a result of the waste heat from the components, in particular the transmission, the internal temperature sensor identifies this, and the reheating is ended by the reheating module.

A variac is preferably provided in order to feed the preheating module, and is connected to the network. This reduces the complexity required in the provision of the electrical energy supply.

The invention also extends to a corresponding method for preheating the wind energy installations. Reference is made to the above statements for more detailed explanations.

BRIEF DESCRIPTION OF THE DRAWINGS

The invention will be explained in the following text with reference to the attached drawings, in which one advantageous exemplary embodiment is illustrated, and in which:

FIG. 3 shows a block diagram of the preheating module used.

DETAILED DESCRIPTION OF THE INVENTION

Figure 1:
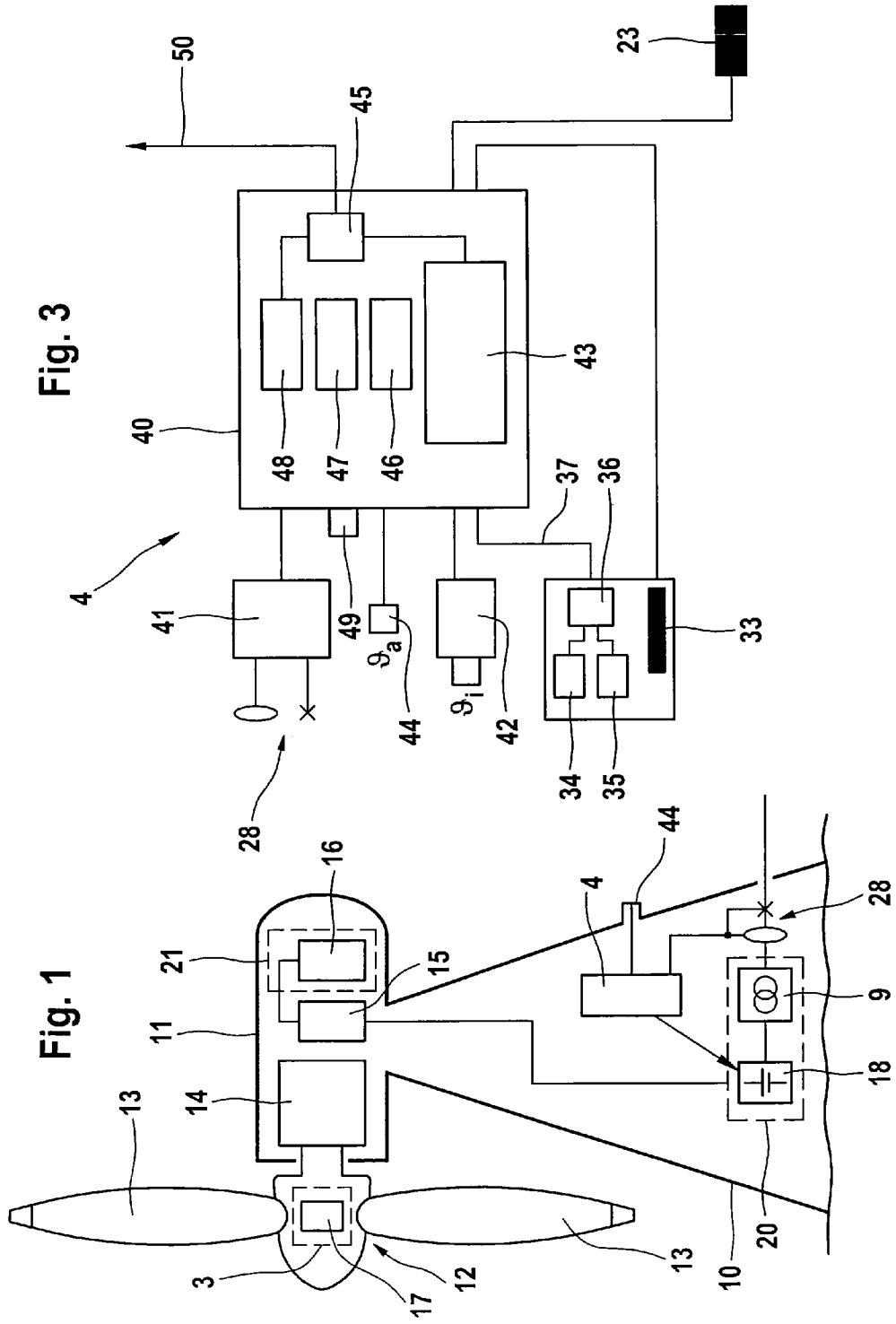
FIG. 1 shows a schematic illustration of a wind energy installation according to one exemplary embodiment of the invention.

According to one exemplary embodiment of the invention, the wind energy installation comprises a tower 10 having a pod 11 which is arranged at the upper end of the tower 10. The pod 11 is designed such that it can pivot in the azimuth direction, such that it can be rotated corresponding to the wind direction. A generator 14, a converter 15 and a top box 21 with a control device 16 are arranged in the interior of the pod. The generator 14 is driven by a wind rotor 12, which is arranged such that it can rotate on one end face of the pod 11 and comprises a plurality of (generally three) rotor blades 13 with a variable pitch angle. A pitch adjustment unit 17 is provided in the hub of the wind rotor 12 in order to adjust the pitch angle (pitch).

An uninterruptible power supply unit 18 and a transformer 9 for connection to a network (not illustrated) are arranged in a bottom unit 20 at the foot of the tower 10. The generator 14 and the converter 15 feed the electrical power, that is produced via a line which is not illustrated, into the bottom box 20 and to the transformer 9, in order to be output to the electrical network.

Figure 2:
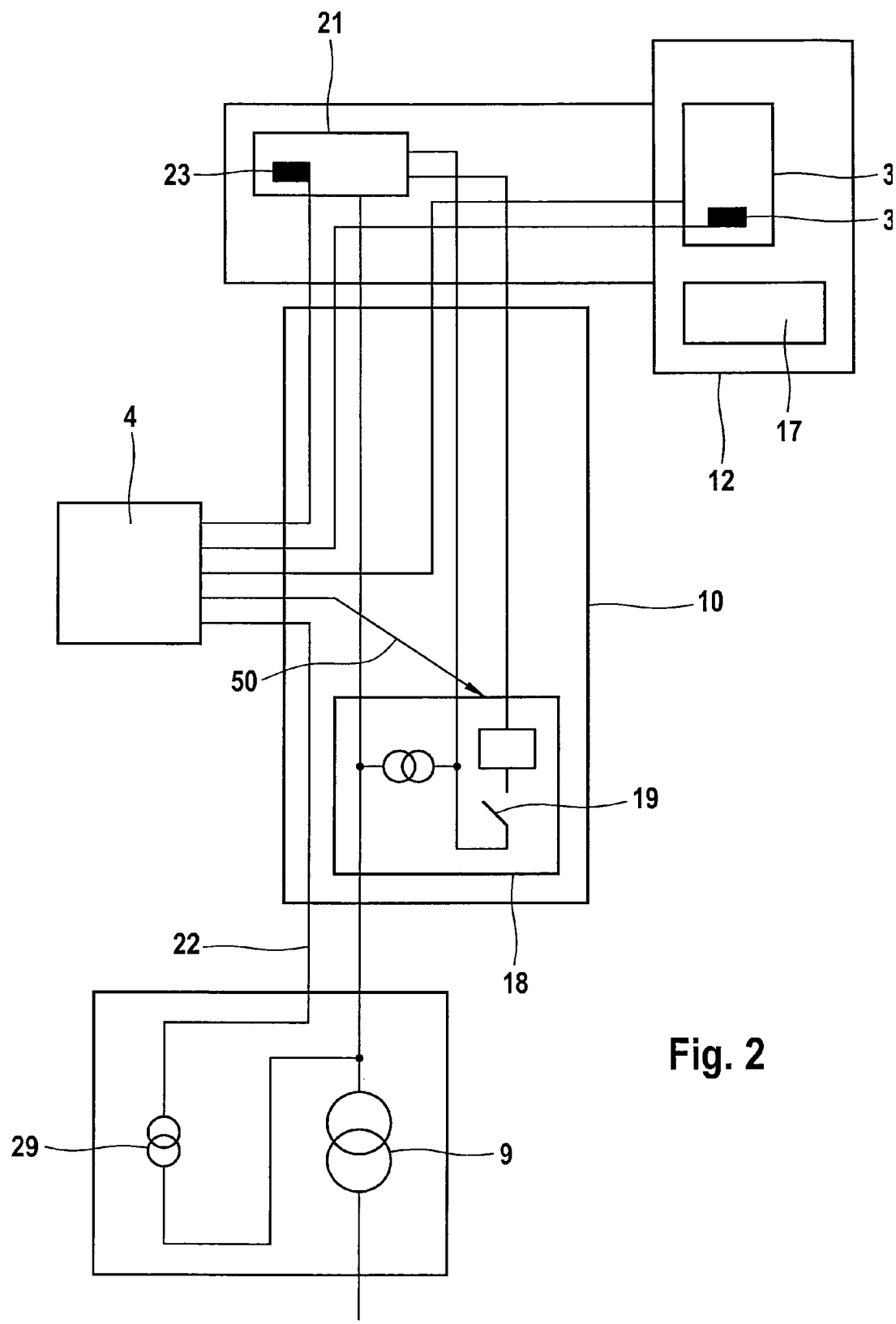
FIG. 2 shows a functional block diagram with the major components of the wind energy installation shown in FIG. 1.

Furthermore, a preheating module 4 is arranged according to the invention on the wind energy installation. This will be described in more detail in the following text with reference to FIGS. 2 and 3. The preheating module 4 and its electrical connection to the wind energy installation are illustrated in FIG. 2. An additional transformer 29, in the form of an economy circuit, for supplying the preheating module 4 is provided in the transformer 9. The embodiment in the form of an economy circuit means that only a small amount of hardware complexity is required for this additional transformer 29, and the power consumption caused by it is extremely low. The additional transformer 29 feeds the preheating module 4 via a 400 V line 22. A plurality of heating devices 23, 33 are connected to this. Furthermore, a signal line 50 is passed out for an enable signal and is connected to the UPS unit 18, which supplies electrical power to the control device 16, the pitch control unit 17 and other components of the wind energy installation. In this case, the UPS unit 18 is designed such that, when the network returns after a network failure, it does not pass on a voltage via its switch 19 to the control device 16, the pitch control unit 17 etc. again until the enable signal is present at the preheating module 4. The heating device 33 for the pitch system 17 is arranged on a remote pitch module 3 in the hub of the rotor 12 and, in addition to the heating device 33, has a thermal switch 34 and a timing relay 35 (not illustrated in FIG. 2). The thermal switch 34 is designed to transmit an appropriate first control signal to the preheating module 4 when a desired threshold temperature is reached. The timing relay 35 is designed to likewise output the first control signal to the preheating module 4 after a time duration which can be set in advance, in the event of a defect of the thermal switch 34 or possibly also of the heating device 33, in order in this way to allow the process of starting up the wind energy installation to continue even in this case.

Further heating devices may be provided in the pod 11, in particular on the top box 21, or in the tower 10, in particular in the bottom box 20. Correspondingly, a thermal switch may be associated with the further heating devices 23, depending on the requirement.

Reference is made to FIG. 3 for the description of the functional relationships and for explanation of how the preheating is carried out before the wind energy installation is started up. The central element of the preheating module 4 is a monitoring unit 40, to which three input signals are connected. A network status detector 41 is connected to a first input. Alternatively or additionally, it is also possible for a signal input for a starting-up signal to be connected to the first input. This makes it possible to apply a starting-up signal to the wind energy installation from an external control device. The method of operation of the invention will be described in more detail in the following text taking account of the network status detector 41, although the invention is not restricted to use with a network status detector 41 such as this. Via current and/or voltage sensors 28 which are arranged on the transformer 9, this network status detector 41 detects the corresponding electrical characteristics of the network and, by means of algorithms which are known per se, determines when a network disturbance is present, in particular a network failure, and when the disturbance has ended, in particular when the network returns after a failure. When the network returns, the network status detector 41 outputs an output signal, and applies this to the first input of the monitor unit 40. An external temperature sensor 44 is connected to a second input of the monitoring unit 40 and is designed to detect the temperature $\theta_A$ in the vicinity of the wind energy installation. A sensor for relative humidity 49 can additionally or alternatively be provided. This is preferably arranged in the top box 21 and, furthermore, additional sensors can be provided on other components to be monitored. For simplicity reasons, the humidity sensor 49 can also be arranged on the monitoring unit 40. A signal line 37 for the temperature reached in the pitch module 17 as a result of the heating is connected to the third input. An evaluation module 36, to which the temperature sensor 34 and the timing relay 35 are connected, is provided at the other end of the signal line. It should be noted that the timing relay 35 and the evaluation module 36 can not necessarily be arranged externally, but can also be arranged internally in the monitoring unit 40. The evaluation module 36 is designed to output a signal when the temperature determined by the temperature sensor 34 has reached a specific threshold. In this case, in addition, a timing signal is evaluated by the timing relay 35 and, when a specific time period has passed, the signal is output irrespective of the temperature determined by the temperature sensor 34. This ensures that, even if the temperature sensor 34 or the heating device 33 fails, an appropriate signal is applied to the monitoring unit 40 after a specific time, which is predetermined by the timing relay 35.

Furthermore, the monitoring unit 40 has three (or more) outputs. The signal line 50 is output at a first output by means of an enable signal for enabling the starting up of the control 16 for the wind energy installation and, in the exemplary embodiment illustrated in FIG. 1, this signal is applied to the UPS unit 18. The heating device 23 is connected to the second output (further heating devices 23 may possibly be connected to fourth and further outputs). The heating device 33 for the pitch system 3 is connected to a third output.

The monitoring unit 40 has a central computation module 43. Furthermore, specific modules are provided for individual functions. A bypass module 48 interacts with the external temperature sensor 44 and is designed to output the enable signal directly via the line 50 when a specific external temperature is exceeded. This results in the preheating step being jumped over.

The computation module 43 is designed to carry out preheating as a preliminary stage before the actual process of starting up the components of the wind energy installation, on the basis of the return of the network being identified by the network status detector 41. The heating devices 23, 33 are activated for this purpose. These heating devices 23, 33 heat the various components of the wind energy installations, such as the bottom box 20, the top box 21 and the pitch system 17, etc. The temperature reached by the heating of the heating devices 23, 33 is detected via temperature sensors, as will be explained in more detail in the following text using the example of the temperature sensor 34 for the pitch system 3. When this temperature sensor 34 signals that the selected temperature threshold has been reached, then an appropriate signal is output to the monitoring unit 40 via the evaluation module 36. The monitoring unit 40 then switches off the heating devices 23, 33, and outputs an enable signal via the line 50. A timer 46 is also provided, and ensures that the enable signal 50 is output in any case after a specific time period has passed. This ensures that the wind energy installation is started up even if the temperature sensor 34 or the heating devices 23, 33 fail.

It is not essential for the heating devices 23, 33 to be switched off when the selected temperature is reached and the enable signal is output. A reheating module 47 can also be provided, and is designed to continue to operate the heating devices 23, 33 even after the temperature threshold has been reached and the enable signal has been output, in order to increase the temperature even further, or at least to stabilize it. The reheating module is preferably connected to the external temperature sensor 44 in order to carry out reheating in those situations in which this is worthwhile and necessary because of particularly low temperatures. The reheating module 47 may also be developed in order to prevent cooling down during continuous operation of the wind energy installation, as well. This may occur in poor weather conditions when there is only little wind and the external temperature is very low, and the wind energy installation is therefore running on partial load, as a result of which the wind energy installation is not adequately heated by the waste heat from the components in the drive train, in particular the transmission and the generator 14. In order to identify such cooling down during operation, a temperature monitor 42 is expediently provided, which has an internal temperature sensor and outputs a signal in order to operate the reheating module, 47 on the monitoring unit 40, when the internal temperature falls below a predeterminable limit value. The reheating module 47 then operates the heating devices 23, 33, until the internal temperature has reached an adequate value, or until the wind energy installation has heated itself up sufficiently as a result of more waste heat being produced by a higher load when the wind freshens.

It should be noted that, in addition to the temperature sensors, use can additionally or alternatively also be made of a sensor for relative humidity 49. If the relative humidity exceeds a specific level, then there is a risk to the integrity of sensitive electronic components. Heating is then carried out in this case by the preheating module 4 according to the invention, and in a corresponding manner to the procedure when the temperature is too low.

When the enable signal has been output via the line 50, the UPS unit is switched on and applies the full supply of voltages from the network to the control device 16, the pitch system 17 and further components, such as the converter 15. Because of the preheating produced by the preheating module 2, the components are sufficiently warm and can then start operation immediately, even in extremely cold external temperatures. The rest of the process of starting up the installations is then carried out in any case synchronously, and without being adversely affected by the low external temperature. Instead of indirect enabling via the UPS unit 18, the components of the wind energy installation can also be connected directly. In a simplified embodiment such as this, the switching signal 50 acts directly on the switch 19 and therefore directly switches on the power supply for the components of the wind energy installation, as a result of which it is started up.

The invention claimed is:

1. A wind energy installation connected to a network, comprising:
    a tower;
    a pod arranged on the tower, the pod comprising a wind rotor and a generator driven by the wind rotor;
    a converter configured to output electrical power generated by the generator;
    a control device provided with a temperature sensor and a heating device; and
    a preheating module comprising a thermal switch configured to monitor a temperature of at least one component of the wind energy installation and a monitoring unit comprising an output device,
    wherein the monitoring unit operates the heating device until the thermal switch reaches a threshold, whereupon the output device transmits an enable signal, and
    wherein the preheating module has a network status detector configured to interact with the monitoring unit such that the heating device is operated when determined that the network has returned.

2. The wind energy installation of claim 1, wherein the enable signal acts directly or indirectly on a switching unit, which produces the electrical power supply for at least one component of the wind energy installation.

3. The wind energy installation of claim 2, further comprising a UPS unit which has the switching unit, wherein the monitoring unit is configured to switch on the UPS unit only when other components of the wind energy installation have been heated to a specific temperature.

4. The wind energy installation of claim 1, further comprising a timer configured to preset a minimum switched-on duration for heating elements and to block the output device until this time has elapsed.

5. The wind energy installation of claim 1, further comprising a plurality of heating devices for different areas of the wind energy installation.

6. The wind energy installation of claim 5, wherein the heating devices are provided for at least one of a top box, a bottom box, and a UPS unit.

7. The wind energy installation of claim 1, further comprising a dedicated temperature sensor provided in a heating device on a pitch module of the wind energy installation.

8. The wind energy installation of claim 1, further comprising a timing relay connected in parallel with the temperature sensor and triggered after an adjustable time.

9. The wind energy installation of claim 1, wherein the monitoring unit is configured to operate the heating device only when at least one temperature limit value has been undershot in at least one component of the wind energy installation.

10. The wind energy installation of claim 1, further comprising an ambient temperature sensor configured to interact with a bypass module and to switch on the output device directly when a specific external temperature is exceeded.

11. The wind energy installation of claim 10, further comprising a reheating module configured to provide reheating as a function of the external temperature even after the enable signal has been output.

12. The wind energy installation of claim 11, wherein the reheating module comprises a temperature monitor configured to interact with the monitoring unit such that the heating device is operated when a limit temperature is undershot during operation.

13. The wind energy installation of claim 12, further comprising an internal temperature sensor applied as an input signal to the temperature monitor.

14. A method for operation of a wind energy installation connected to a network, the wind energy installation having a tower, a pod arranged on the tower and having a wind rotor and a generator driven by the wind rotor, a converter configured to output electrical power generated by the generator, and a control device, wherein at least some of the components of the wind energy installation are heated, the method comprising:
monitoring a signal for the start of operation;
operating a heating device configured to heat at least one of the components of the wind energy installation when determined that the network has returned;
monitoring a temperature that is reached for the at least one of the components;
triggering a switching signal on reaching a specific threshold; and
transmitting an enable signal to the control device to start up the wind energy installation.

* * * * *